(12) United States Patent
Beaurepaire

(10) Patent No.: US 9,773,416 B2
(45) Date of Patent: Sep. 26, 2017

(54) METHOD, APPARATUS AND COMPUTER PROGRAM PRODUCT FOR LANE FILTERING

(71) Applicant: HERE Global B.V., Veldhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/153,176

(22) Filed: May 12, 2016

(65) Prior Publication Data

US 2017/0169710 A1  Jun. 15, 2017

(30) Foreign Application Priority Data

May 28, 2015 (EP) .................................... 15169564

(51) Int. Cl.
*G08G 1/16* (2006.01)
*G08G 1/0965* (2006.01)

(52) U.S. Cl.
CPC .......... *G08G 1/167* (2013.01); *G08G 1/0965* (2013.01); *G08G 1/163* (2013.01); *G08G 1/166* (2013.01)

(58) Field of Classification Search
CPC ...... G08G 1/167; G08G 1/0965; G08G 1/163; G08G 1/166
USPC ........................................................ 340/903
See application file for complete search history.

(56) References Cited

U.S. PATENT DOCUMENTS

| | | | | |
|---|---|---|---|---|
| 8,473,144 B1* | 6/2013 | Dolgov | ............... | B60W 30/095 348/119 |
| 2013/0311075 A1* | 11/2013 | Tran | ...................... | B60W 30/09 701/117 |
| 2016/0306357 A1* | 10/2016 | Wieskamp | ......... | B62D 15/0265 |

FOREIGN PATENT DOCUMENTS

| | | |
|---|---|---|
| DE | 102007002262 A1 | 8/2008 |
| DE | 102007053274 A1 | 5/2009 |
| DE | 102012005245 A1 | 9/2012 |
| EP | 1508819 A1 | 2/2005 |

OTHER PUBLICATIONS

European Search Report for related European Application No. 15169564 dated Nov. 10, 2015.

* cited by examiner

*Primary Examiner* — Kerri McNally
(74) *Attorney, Agent, or Firm* — Lempia Summerfield Katz LLC

(57) ABSTRACT

The disclosure relates to a method for lane filtering. In particular, the present embodiments relate to a method for determining whether lane filtering may be performed, an apparatus for lane filtering and computer program code to implement the determination by a device. In accordance with an example method information of a distance between a second vehicle and a third vehicle adjacent to each other and in front of a first vehicle is obtained. It is determined whether the distance is big enough for the first vehicle to proceed through the space between the second first vehicle and the third vehicle. An indication is provided on the basis of the result of the determining.

19 Claims, 9 Drawing Sheets

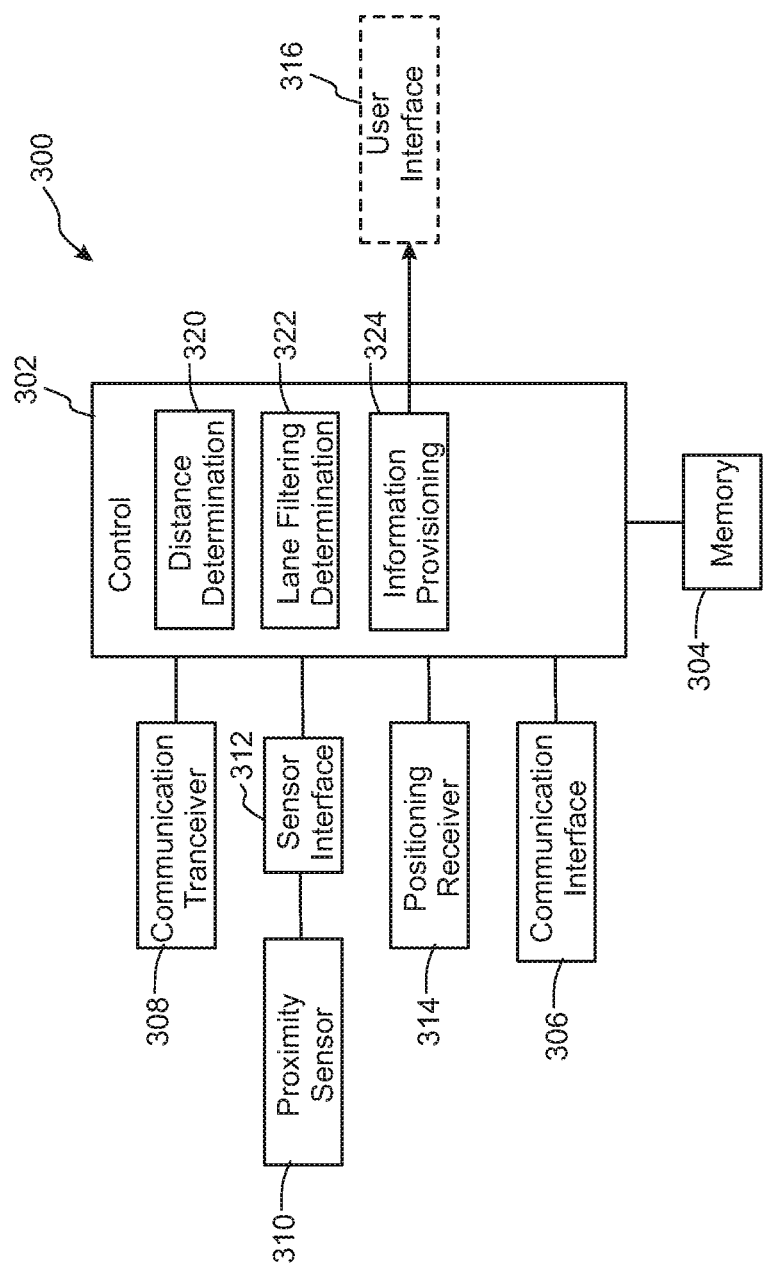

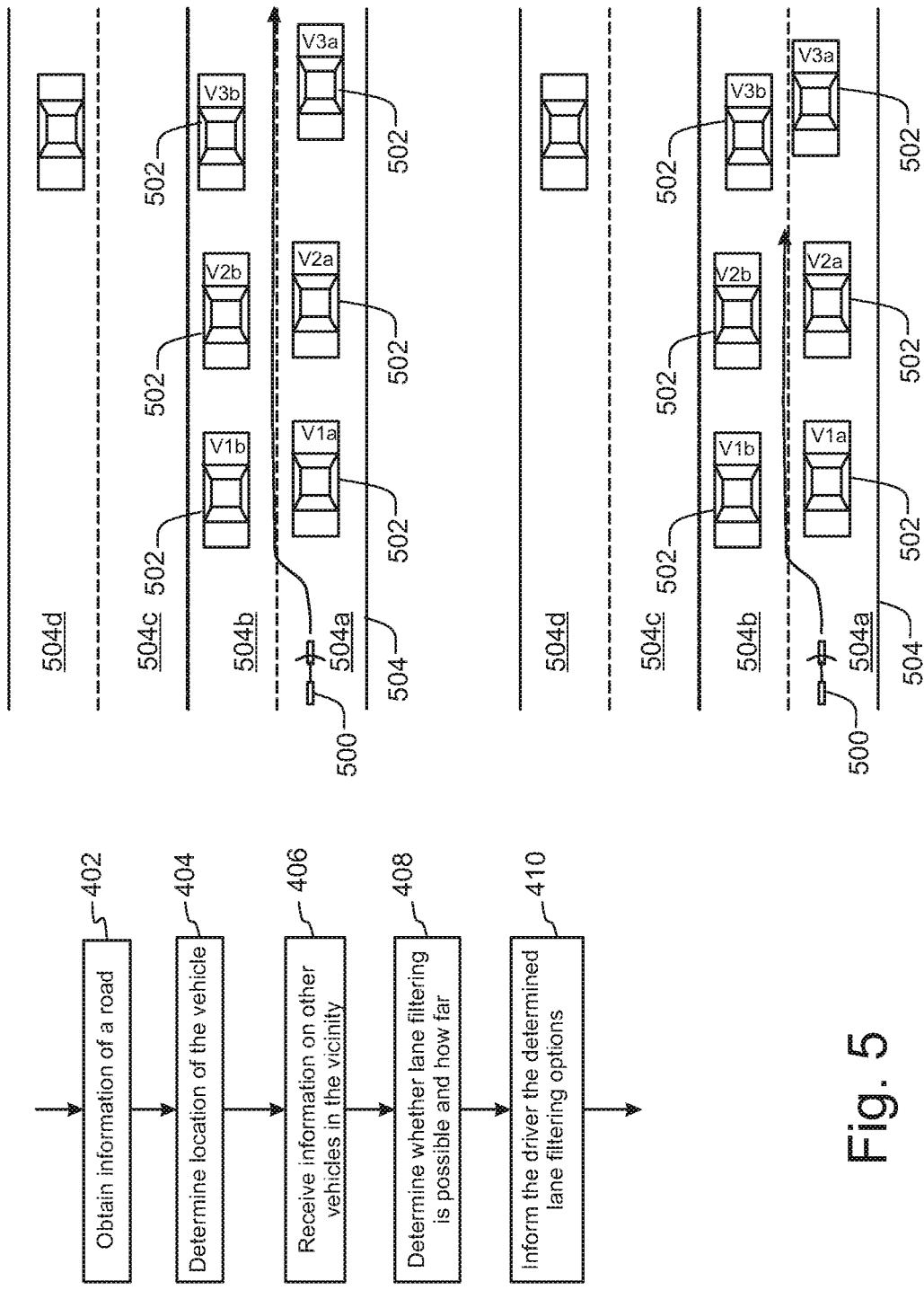

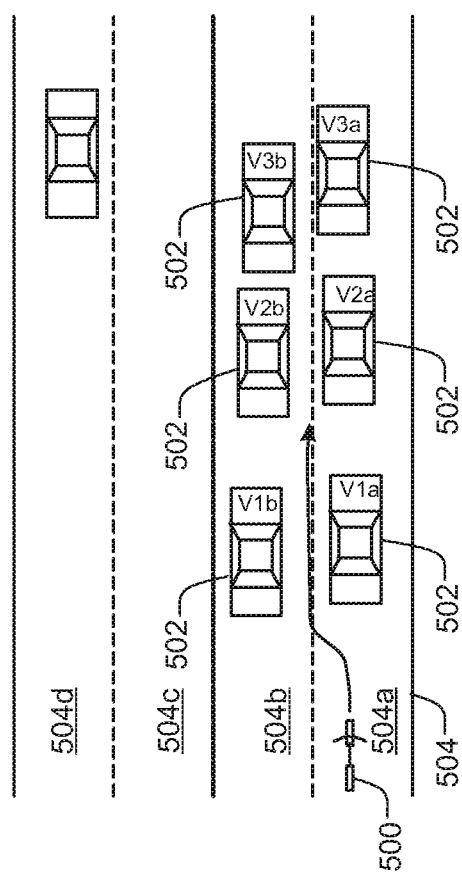

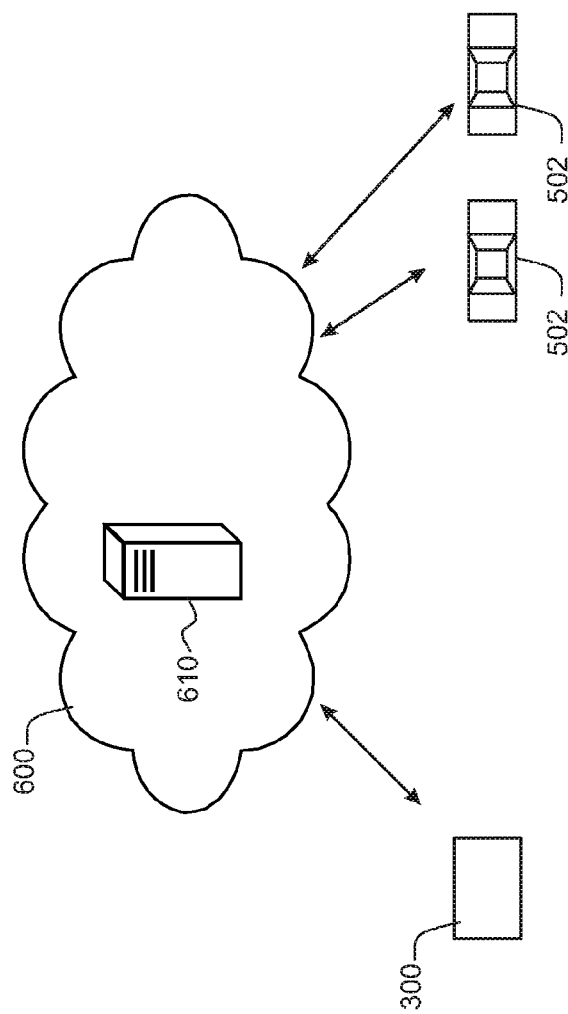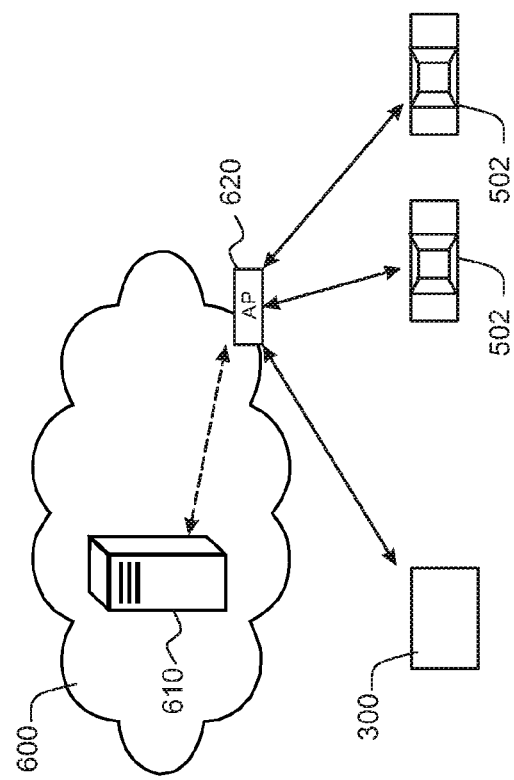

METHOD, APPARATUS AND COMPUTER PROGRAM PRODUCT FOR LANE FILTERING

This application claims the benefit under 35 U.S.C. §119 to European Patent Application No. EP 15169564.0, filed on May 28, 2015, which is hereby incorporated by reference in its entirety.

FIELD OF THE INVENTION

The present embodiments relate generally to a method for lane filtering. In particular, the present embodiments relate to a method for determining whether lane filtering may be performed, an apparatus for lane filtering and computer program code to implement the determination by a device.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The term lane filtering relates to a situation in which someone is riding a motorcycle, or any other vehicle, at low speeds between stationary or slow moving vehicles, which are travelling in the same direction as the motorcycle rider. In other words, there are two or more parallel queues of vehicles, one on each lane of the road, and the motorcycle rider rides between two adjacent queues of vehicles. This kind of situation may also be called as lane sharing, lane splitting, stripe-riding or white-lining.

It may happen that when the motorcycle rider is lane filtering the space ahead between the two queues may become so narrow that lane filtering may not be safe enough and the motorcyclist should stop at a distance before such location. It may not be easy to estimate such situations by naked eye so the motorcyclist may stop unnecessarily early or proceed too near the narrower spot.

SUMMARY OF THE INVENTION

Various embodiments of the invention include a semiconductor chip, a method, an apparatus, and a computer readable medium comprising a computer program stored therein, which are characterized by what is stated in the independent claims. Various embodiments of the invention are disclosed in the dependent claims.

According to a first example, a method comprises
obtaining information of a distance between a second vehicle and a third vehicle adjacent to each other and in front of a first vehicle;
determining whether the distance is big enough for the first vehicle to proceed through the space between the second vehicle and the third vehicle; and
providing an indication on the basis of the result of the determining.

According to a second example, an apparatus comprises: means for performing the actions of any of the method claims.

According to a third example, an apparatus comprises at least one processor, memory including computer program code, the memory and the computer program code configured to, with the at least one processor, cause the apparatus to perform at least the following:
obtain information of a first distance between a second vehicle and a third vehicle adjacent to each other and in front of a first vehicle;
determine whether the first distance is big enough for the first vehicle to proceed through the space between the second vehicle and the third vehicle; and
provide an indication on the basis of the result of the determining.

In accordance with an example embodiment of the apparatus said memory and the computer program code are configured to, with the at least one processor, cause the apparatus to obtain information of the first distance by:
obtaining information of a location of the second vehicle and a location of the third vehicle; and
using the location information to determine the first distance.

In accordance with an example embodiment of the apparatus said memory and the computer program code are configured to, with the at least one processor, cause the apparatus to:
obtain information of a second distance between a fourth vehicle in front of the second vehicle in a first queue and a fifth vehicle in front of the third vehicle in a second queue; and
use the first distance information and the second distance information to determine how long the first vehicle may be able to proceed through the space between the first queue and the second queue.

In accordance with an example embodiment of the apparatus said memory and the computer program code are configured to, with the at least one processor, cause the apparatus to perform at least one of the following:
receive the first distance information from the second vehicle;
receive the second distance information from the fourth vehicle.

In accordance with an example embodiment of the apparatus said memory and the computer program code are configured to, with the at least one processor, cause the apparatus to:
receive the result of the determining from a server of a cloud computing network.

In accordance with an example embodiment of the apparatus said memory and the computer program code are configured to, with the at least one processor, cause the apparatus to:
receive a lane filtering information from a driver of the first vehicle regarding whether to proceed through a space between adjacent vehicles; and
send the lane filtering information to one or more other vehicles in front of the first vehicle.

In accordance with an example embodiment of the apparatus said memory and the computer program code are configured to, with the at least one processor, cause the apparatus to:
determine whether the first vehicle is approaching at least one of the second vehicle and the third vehicle; and if so, how fast, to decide whether to perform said obtaining information of a first distance, determining whether the first distance is big enough, and providing said indication.

In accordance with an example embodiment of the apparatus said memory and the computer program code are configured to, with the at least one processor, cause the apparatus to:

obtain information on dimensions of one or more the first vehicle and the second vehicle; and use the dimensions information in determining whether the first distance is big enough for the first vehicle to proceed through the space between the second vehicle and the third vehicle.

In accordance with an example embodiment of the apparatus said memory and the computer program code are configured to, with the at least one processor, cause the apparatus to:

determine whether a blinker of the vehicle has been switched on; and if so, to examine whether another lane in the same direction of the road is free and/or if lane filtering might be possible between vehicles on other lanes of the road.

In accordance with an example embodiment of the apparatus said memory and the computer program code are configured to, with the at least one processor, cause the apparatus to perform said determining whether the first distance is big enough by:

comparing the first distance with a predetermined minimum distance value; and if the first distance is larger than the minimum distance, deducing that the space between the second vehicle and the third vehicle is big enough for the first vehicle to proceed through the space between the second vehicle and the third vehicle.

According to a fourth example, a computer program product embodied on a non-transitory computer readable medium, comprises computer program code configured to, when executed on at least one processor, cause an apparatus or a system to:

obtain information of a first distance between a second vehicle and a third vehicle adjacent to each other and in front of a first vehicle;

determine whether the first distance is big enough for the first vehicle to proceed through the space between the second vehicle and the third vehicle; and provide an indication on the basis of the result of the determining.

According to a fifth example, an apparatus comprises:

means for obtaining information of a first distance between a second vehicle and a third vehicle adjacent to each other and in front of a first vehicle;

means for determining whether the first distance is big enough for the first vehicle to proceed through the space between the second vehicle and the third vehicle; and means for providing an indication on the basis of the result of the determining.

In accordance with an embodiment, drivers of vehicles may be able to make better decisions regarding lane filtering by helping them visualizing the space immediately in front of them and further away.

DESCRIPTION OF THE DRAWINGS

In the following, various embodiments of the invention will be described in more detail with reference to the appended drawings, in which

FIG. 4 shows an example of an apparatus, in accordance with an embodiment;

FIG. 5 illustrates an embodiment of a method as a flowchart;

FIGS. 6a to 6c illustrate in a simplified manner example situations regarding lane filtering;

FIG. 8 illustrates a system in accordance with an embodiment;

FIG. 9 illustrates a system in accordance with yet another embodiment; and

DETAILED DESCRIPTION OF THE INVENTION

Figure 2:
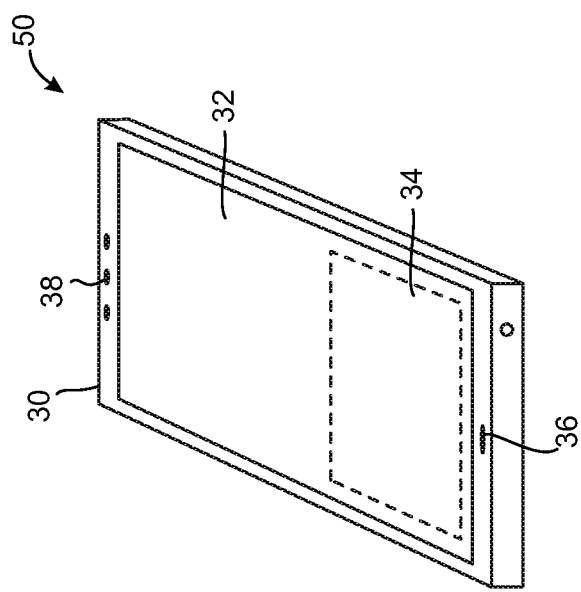
FIG. 2 shows a layout of an apparatus according to an embodiment.
Figure 1:
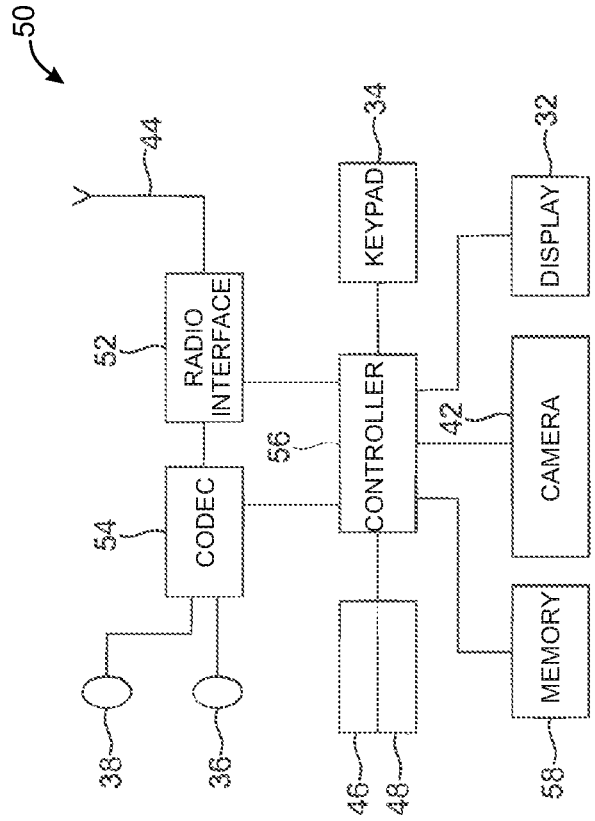
FIG. 1 shows an apparatus according to an embodiment.

FIGS. 1 and 2 illustrate an apparatus according to an embodiment. The apparatus 50 is an electronic device, for example a mobile terminal or a user equipment of a wireless communication system (e.g. a cellular phone, a personal digital assistant (PDA), a smartphone, a tablet computer or the like), a camera device, etc. The embodiments disclosed in this application can be implemented within any electronic device or apparatus which is able to receive wireless signals and perform positioning or assisting in the positioning. The electronic device or apparatus may be connectable to a network. The apparatus 50 may comprise a housing 30 for incorporating and protecting the device. The apparatus 50 further may comprise a display 32, for example, a liquid crystal display or any other display technology capable of displaying images and/or videos. The apparatus 50 may further comprise a keypad 34. According to another embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which may be any of the following: an earpiece 38, a speaker or an analogue audio or digital audio output connection. The apparatus 50 may also comprise a battery (according to another embodiment, the device may be powered by any suitable mobile energy device, such as solar cell, fuel cell or clockwork generator). The apparatus may comprise a camera 42 capable of recording or capturing images and/or video, or may be connected to one. According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired solution.

The apparatus 50 may comprise a controller 56 or processor for controlling the apparatus. The controller 56 may be connected to memory 58 which, according to an embodiment, may store both data in the form of image and audio data and/or may also store instructions for implementation on the controller 56. The controller 56 may further be connected to codec circuitry 54 suitable for carrying out coding and decoding or audio and/or video data or assisting in coding and decoding carried out by the controller 56. However, the apparatus 50 may not comprise the codec circuitry 54.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

Figure 3:
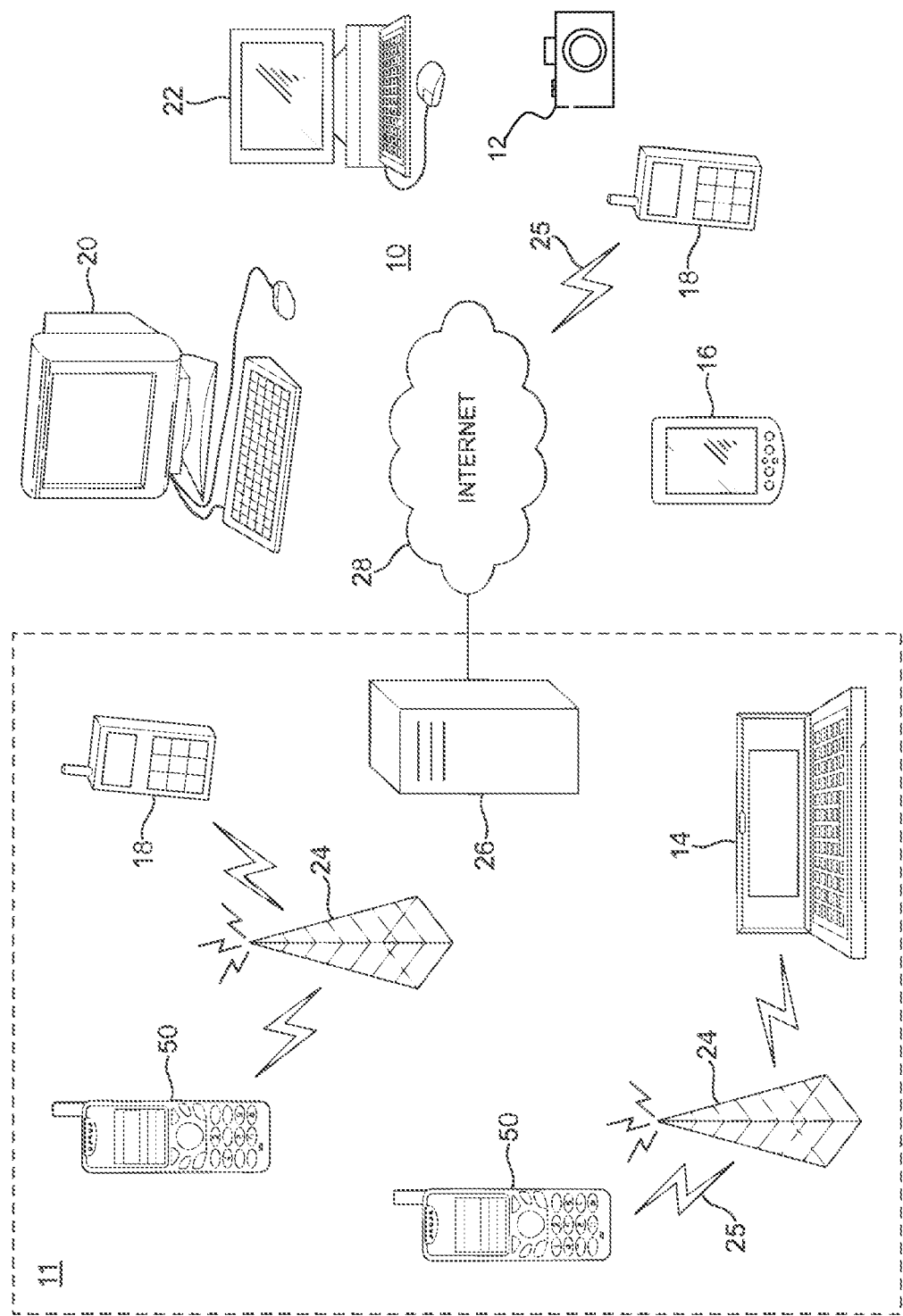
FIG. 3 shows a system according to an embodiment.

FIG. 3 shows a system configuration comprising a plurality of apparatuses, networks and network elements according to an embodiment. The system 10 comprises multiple communication devices which can communicate through one or more networks. The system 10 may comprise any combination of wired or wireless networks including, but not limited to a wireless cellular telephone network (such as a GSM, UMTS, CDMA network, etc.), a wireless local area network (WLAN), such as defined by any of the IEEE 802.x standards, a Bluetooth personal area network, an Ethernet local area network, a token ring local area network, a wide area network, and the internet.

The system 10 may include both wired and wireless communication devices or apparatus 50 suitable for implementing present embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a digital camera 12. The apparatus 50 may be stationary or mobile when carried by an individual who is moving. The apparatus 50 may also be located in a mode of transport.

Some of further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telephone system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio infrared, laser, cable connections or any suitable connection.

In the following some details of an example of the apparatus 300 for a vehicle 500 or a driver of the vehicle will be described with reference to FIG. 4. The apparatus 300 may be part of the apparatus of FIGS. 1 and 2 or may be separate from it, wherein the apparatus 300 may utilize some elements of the apparatus of FIGS. 1 and 2. In this example embodiment the controller 302 may take care of controlling the operation of the device 300 or some parts of the device 300. The memory 304 may be used to store information, program code and/or other data. The communication interface 306 may be used to communicate with other devices, such as with the server 26, 610, with the access points 103, etc. The positioning receiver 314 may utilize signals from positioning satellites, signals of wireless local area network, signals of a cellular network, and/or some other signals in determining the location of the apparatus 300.

The apparatus 300 may also comprise a communication transceiver 308 adapted to communicate with other vehicles to obtain information from the other vehicles and/or to send information to the other vehicles, as will be described later in this specification. Further, the apparatus 50 may comprise an interface 312 for one or more proximity sensors 310. The proximity sensor(s) may measure distance of the vehicle to other vehicles nearby, e.g. to a vehicle beside and/or ahead of the vehicle.

FIG. 4 also illustrates some operational blocks for performing a method for lane filtering, in accordance with an embodiment. The distance determination block 320 may estimate or obtain information on distance from the vehicle 500 to other vehicles 502 and/or distance between two adjacent vehicles V1a, V1b; V2a, V2b (block 420 in FIG. 10). The lane filtering determination block 322 may use gathered information to determine whether lane filtering is possible (block 422 in FIG. 10). The information provisioning block 324 provides information regarding lane filtering to a user interface, for example to the display 32 and/or to the earpiece 38 of the apparatus 50 (block 424 in FIG. 10). The display 32 may be a head up display (HUD), which is any transparent display that presents data without requiring users to look away from their viewpoints. The display 32 may be a head-mounted display or helmet-mounted display, where the display element moves with the orientation of the user's head.

In accordance with an embodiment the apparatus 300 may comprise its own user interface 316, wherein the apparatus 300 may not need to provide lane filtering information to the apparatus 50.

It should also be noted here that some of the blocks 306 to 312 may be implemented as separate circuitry or as a program code of the controller 302 or both.

In the following a method for lane filtering according to an example embodiment will be described in more detail with reference to the flow diagrams of FIGS. 5 and 10 and the example situation of FIGS. 6a to 6c. It is assumed that the vehicle 500 is a motorcycle and a person is riding the motorcycle on a road 504. However, the vehicle need not be a motorcycle but may be, for example, a bicycle, a car, a truck, a lorry, etc. In the example of FIG. 6a it is assumed that the motorcycle may be able to pass by the whole queue V1a, V2a, V3a; V1b, V2b, V3b. In the example situation of FIG. 6b it is assumed that the motorcycle may be able to pass by a couple of vehicles V1a, V2a; V1b, V2b and can stop just before a bottleneck i.e. just before a location in which the space between two vehicles V3a, V3b is not enough for lane filtering. FIG. 6c illustrates an example in which the driver is recommended to stop before vehicles V2a, V2b due to missing space just before the bottleneck between vehicles V3a, V3b. In other words, in the example situation of FIG. 6c the successive vehicles V2a and V3a of the first queue and/or the successive vehicles V2b and V3b of the second queue are so close to each other that it might not be safe enough for the vehicle 500

The apparatus 300 may be provided with information on the road 504 in the neighbourhood of the apparatus 300, such as a map, in a digital form (block 402 in FIG. 5). The information may have been downloaded beforehand or it may be downloaded in real time i.e. during the riding of the vehicle. The positioning receiver 314 may receive signals from positioning satellites to determine the current location of the vehicle 500 (block 404), wherein the controller 302 may use the location information and the map to produce visible information of the current location and a corresponding section of the map on the display 32. The controller 302 may also calculate the current speed of the vehicle 500, for example by using several consecutive location data and time data, or the positioning receiver 314 may perform the speed calculation and provide that information to the processor 302.

The map information may comprise information on the number of lanes 504a-504d and the width of the lanes 504a-504d of the road 504 at the current location. The map information may also comprise information on road signs and/or some other information regarding the road, such as a speed limit.

In accordance with an embodiment, information regarding the road may comprise information of conditions of the road, such as whether there is a construction work going on or not, the material of the surface of the road etc. This kind of information may be obtained by receiving road condition data from an information centre. Examples of this kind of services are a radio broadcast data system (RBDS) and a traffic message channel (TMC). The traffic message channel (TMC) may utilise the radio broadcast data system.

The apparatus 300 of the vehicle 500 may receive information from other vehicles 502 (block 406), which are in the proximity of the vehicle 500. For example, the apparatus 300 may receive information from one or more vehicles ahead of and which are proceeding the same direction and on the same road 504 than the vehicle 500. That information may comprise information of the distance between two adjacent vehicles which defines the free space i.e. the width usable for lane filtering. However, some security marginal may be applied so that there is enough space for the vehicle between two vehicles to pass them by safely enough. In accordance with an embodiment, the driver of the vehicle 500 may manually set a value to a parameter which indicates a minimum distance the driver wishes to have between two vehicles before s/he may utilise lane filtering.

The other vehicle may be a bike, a motorcycle, a car, a truck, a lorry, a bus, etc.

Information on the vehicles may comprise dimensions of the vehicles (static vehicle data). This dimension information may be utilised, for example, in determining the space between two adjacent vehicles. However, if the dimension information is not available for one or more vehicles, information on the distance from one vehicle to another vehicle may be obtained on the basis of measurements performed by one or more of the vehicles in question.

The apparatus 300 may also obtain information regarding the distance from the vehicle 500 to the nearest vehicle in the queue(s). This information may be obtained e.g. by a distance sensor 520 of the vehicle 500 and/or from location information which may be received from vehicles in the queue(s), from cloud, etc. For example, the distance between the vehicle 500 and one or more vehicles in the queue can be measured by one or more front facing sensors on the vehicle 500 (e.g. proximity sensor(s)). As another example, sensors of one or more vehicles involved may obtain information on the distance between vehicles and communicate this information to the vehicle 500. This kind of communication may be called as vehicle-to-vehicle (V2V) communication. As a yet another example, sensors of one or more vehicles involved may obtain information on the distance between vehicles and communicate this information to a cloud, wherein the vehicle 500 may request this information from the cloud. It may also be possible to determine distances between vehicles by utilising position data of the vehicles. For example, the vehicles may comprise a positioning receiver which sequentially determines the position of the vehicle and the position information may then be sent to a cloud and/or to other vehicles in the vicinity. Thus, the other vehicles may obtain the position information of other vehicles and use that information together with the position information of the vehicle itself to determine locations of other vehicles and distances between different vehicles. Position information may further be used to determine speed of other vehicles.

The distance information may also be obtained by using one or more cameras in the vehicle 500, wherein the image information captured by the one or more cameras may be used in estimating the distance. Furthermore, image information captured by the cameras may also be used to determine possible queues in the road.

The apparatus 300 may also use information of speed of the vehicle 500 and/or speed of vehicle(s) 502 in the queue to determine whether the vehicle 500 is approaching the queue and if so, how fast the vehicle 500 is about to reach the queue. The result of the determination may be used to estimate whether the lane filtering may become an issue or not (block 408). Speed information of the vehicle 500 may be obtained from a speedometer of the vehicle 500, by utilising the positioning information of the vehicle 500, etc. Speed information of other vehicle(s) may be gathered by communicating with the vehicle(s) in the queue, from a cloud, etc.

The apparatus 300 may form indication about the situation to the user e.g. as a visual information by the display, as an audible information by the loudspeaker, as vibrations and/or by using other appropriate means. For example, the apparatus 300 may indicate the distance how long the vehicle 500 could lane filter before the width of the free space became too narrow for lane filtering (block 410). Thus, the driver may then decide on the basis of this information whether to lane filter or not.

The lane filtering operation may be set e.g. automatically when the apparatus 300 determines that the vehicle 500 is approaching a queue. Instead of or in addition to the automatic initiation, the lane filtering operation may be set manually by the driver of the vehicle 500.

By combining the gathered data, the apparatus 300 may determine whether there is enough space for a bike to go between two vehicles, whether this is considered safe and whether there is a proper space to possibly stop after those vehicles. For example in the example situation of FIG. 6b, the apparatus 300 may determine that the vehicle 500 may perform lane filtering to pass two last vehicles V1a, V1b, V2a, V2b of the two adjacent queues but the next vehicles V3a, V3b are two close to each other for lane filtering. Hence, the apparatus 300 may provide a corresponding indication to the driver.

In accordance with an embodiment, the lane filtering operation may only be enabled when the speed of the vehicle 500 is less than a threshold, e.g. 30 km/h. This restriction may depend on local regulations and/or security issues so that possible risks of the lane filtering are not too high.

In accordance with an example embodiment, the information gathered from the vehicle(s) may also be used to determine if there is a free lane, wherein the driver may change to such a lane well in advance instead of trying to lane filter.

The driver of the vehicle 500 may consider changing a lane, wherein the driver may switch a blinker of the vehicle 500 on. Hence, in accordance with an example embodiment, the apparatus 300, the server 610 or other entity may determine whether another lane 504a, 504b in the same direction of the road 504 is free and/or if lane filtering might be possible between vehicles on other lanes of the road.

Figure 7A:
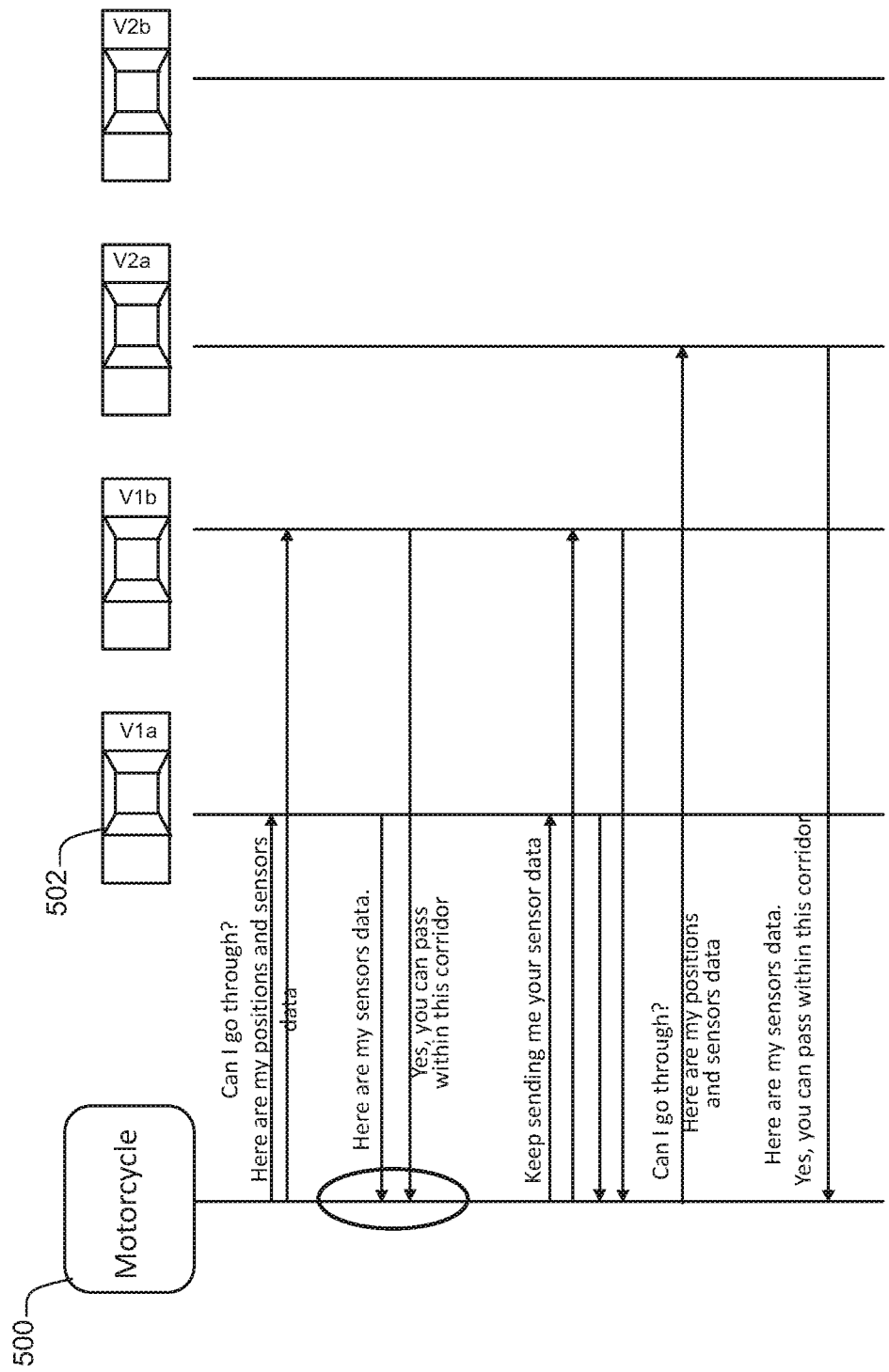
FIGS. 7a and 7b illustrate examples of information exchange between different entities.

The diagram of FIG. 7a illustrates signaling regarding lane filtering between different entities of a system, in accordance with an embodiment. The vehicle 500 which is approaching a possible lane filtering situation may send information on the position of the vehicle 500 and some sensor data to vehicles 502 in the queue and possibly data of the dimensions of the vehicle 500. Vehicles which receive the information may send back sensor data of their own sensors, such as proximity information and/or position information. The vehicles in the queue may also estimate whether there is enough space at the locations of the vehicles and send the result of the estimation to the vehicle 500, wherein the vehicle 500 may use the result and show the driver whether lane filtering is possible and if so, how far in the queue.

In accordance with an example embodiment the method may operate as follows. Vehicles send sequentially information on their location to a server 610 in a cloud 600 (FIG. 8). The information may also comprise identification information of the vehicle which has sent the information. Hence, the apparatus 300 of the vehicle 500 may indicate to the server 610 that it considers lane filtering due to a queue which the vehicle 500 is approaching. The apparatus 300 may inform the server 610 the current location of the vehicle 500. The server 610 may then examine information stored in the cloud 600 to determine which vehicles are in the neighbourhood of the vehicle 500. The server 610 may then use location and distance information to determine whether lane filtering is possible or not and send this information to the apparatus 300 of the vehicle 500 so that the apparatus 300 may indicate the driver whether there is enough space for lane filtering or not. Alternatively the server 610 may send location and/or distance data to the apparatus 300 of the vehicle 500 which may then perform the analyses of the data to determine possibility for lane filtering.

In accordance with an example embodiment, operations regarding lane filtering may be mainly performed in the cloud 600 wherein the vehicles 500 may send sensor data such as location and possibly distance to other vehicles beside, in front of and/or behind, to the cloud 600. Calculations may then be performed in the cloud 600 to determine possibilities for lane filtering if a vehicle has indicated that it might consider lane filtering when space between two queues allows it.

Figure 7B:
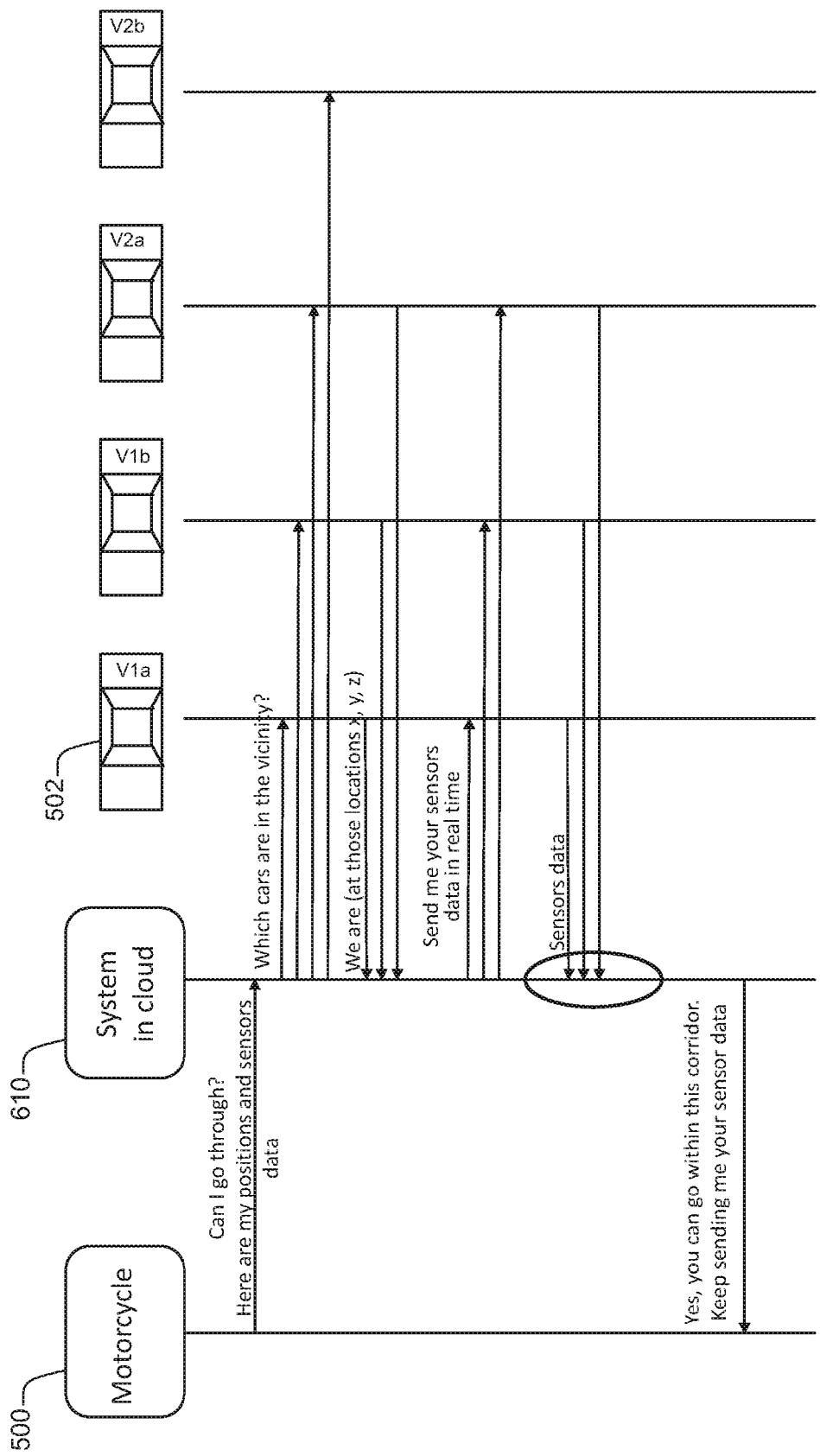

The diagram of FIG. 7b illustrates signaling regarding lane filtering between different entities of a system utilising cloud computing, in accordance with an embodiment. The vehicle 500 which is approaching a possible lane filtering situation may send information on the position of the vehicle 500 and some sensor data and possibly data of the dimensions of the vehicle 500 to the server 610 in the cloud 600. The server 610 may send a query to vehicles in the neighbourhood to find out which vehicles are in the queue. The vehicles which receive the query and are in the vicinity of the vehicle 500 may send back information on their locations to the server 610. The server 610 may also obtain map information of the location of the vehicle 500. The server 610 may then request sensor data from the vehicles and use the received sensor data to perform computations for determining if lane filtering is possible and how far. For example, the server 610 may analyze the traffic ahead (maybe a certain threshold distance) based on the query from the vehicle 500, and may determine a free path (e.g. path center line, length) between vehicles 502 on adjacent and parallel lanes ahead of the vehicle 500, and safe/recommended stop/rest positions.

The server 610 may inform the apparatus 300 of the vehicle 500 about the free path (just ahead, but also out of the visibility of the driver of the vehicle 500) and stop/rest positions, and the apparatus 300 may render the information to the driver based on its dynamic location. The server 610 may request the apparatus 300 of the vehicle 500 to keep sending sensor data to the server 610.

In accordance with an example embodiment, operations regarding lane filtering may also be distributed amongst the apparatus 300 and the cloud 600. For example, some vehicles may not be able to communicate with the cloud 600 but are able to communicate position and/or distance data to the apparatus 300 of the vehicle 500. Hence, the apparatus 300 may obtain vehicle related data partly from cloud and partly from vehicle(s) directly.

In accordance with yet another example embodiment, illustrated in FIG. 9, operations regarding lane filtering may also be performed utilizing so called edge computing. In other words, some parts of the computing may be performed in a communication network which the apparatus 300 is communicating with. As an example, the apparatus 300 may be communicating with an access point (AP) 620 of a mobile communication network, wherein the access point 620, such as a base station, may take part of the computing operations. Hence, all the information needed for the operations regarding lane filtering need not be transmitted to the server 610.

In the following the method in accordance with another example embodiment will be explained in more detail. In this embodiment the vehicle 500 which gathers and utilises the gathered information is an emergency vehicle, such as an ambulance, a fire engine, a police car, etc. Also the emergency vehicle may utilize the information regarding positions of the vehicles and the free space between two adjacent vehicles to determine whether the emergency vehicle is able to drive forward via the space between two adjacent queues. Additionally, the information may reveal whether there is enough space outside the lanes of the road, e.g. in the shoulder of the road.

In accordance with an example embodiment, the system described above may also be utilised to send information from the vehicle 500, which considers lane filtering, to vehicles in the queues. This may be performed, for example, to warn drivers of other vehicles of the approaching motorcycle which performs lane filtering, or to warn drivers of other vehicles of the approaching emergency vehicle so that drivers may try to sidestep and increase the free space between queues.

In accordance with an example embodiment, the system described above may also be utilised to send information from the vehicle 500 regarding intended behaviour of the driver of the vehicle. For example, the driver mat indicate to the apparatus 300 that s/he has decided to lane filter to the point which the apparatus 300 indicated is a safe location to stop, e.g. before a bottleneck between vehicles V2a, V2b in the example of FIG. 6c. Hence, the apparatus 300 may send corresponding information to the vehicles V1a, V2a, V3a, V1b, V2b, V3b which may inform their drivers about the lane filtering accordingly.

In accordance with an example embodiment, it may be possible to perform lane filtering determination using only sensor data available from the vehicle 500. Sensors of the vehicle 500 may gather information about vehicles in front to determine those vehicles' parameters, such as location, direction, speed, type (e.g. width), identification information etc. to know if the vehicle 500 can lane filter. This information may be sent to the cloud 600 where e.g. the server 610 may analyze traffic ahead based on the sensor data and may determine a free path (e.g. path center line, length) between vehicles on adjacent and parallel lanes ahead of the vehicle 500. The server 610 may then inform the vehicle 500 about the free path (just ahead) and the vehicle 500 may render the information to the driver based on its dynamic location.

In accordance with an example embodiment, the system may also be used to check if there is a reserved area in front of a traffic light. The map information may reveal that the vehicle 500 is approaching a cross roads and if the cross roads has an area (a lane) in front of the traffic lights reserved for cycles, motorcycles etc. If it is detected that there is such a lane, then the system could guide the user till the front but if there is none or if it is full, then the system may consider it in the related guidance commands given to the user.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

As described above, FIG. 5 is an example flowchart of a method according to an example embodiments. It will be understood that each block of the flowchart, and combinations of blocks in the flowchart, may be implemented by various means, such as hardware, firmware, processor, circuitry and/or other device associated with execution of software including one or more computer program instructions.

For example, one or more of the procedures described above may be embodied by computer program instructions. In this regard, the computer program instructions which embody the procedures described above may be stored by a memory device 304 of an apparatus 300 employing an embodiment of the present invention and executed by a processor 302 in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks.

These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 5, when executed, convert a computer or processing circuitry into a particular machine configured to perform an example embodiment of the present invention.

Figure 10:
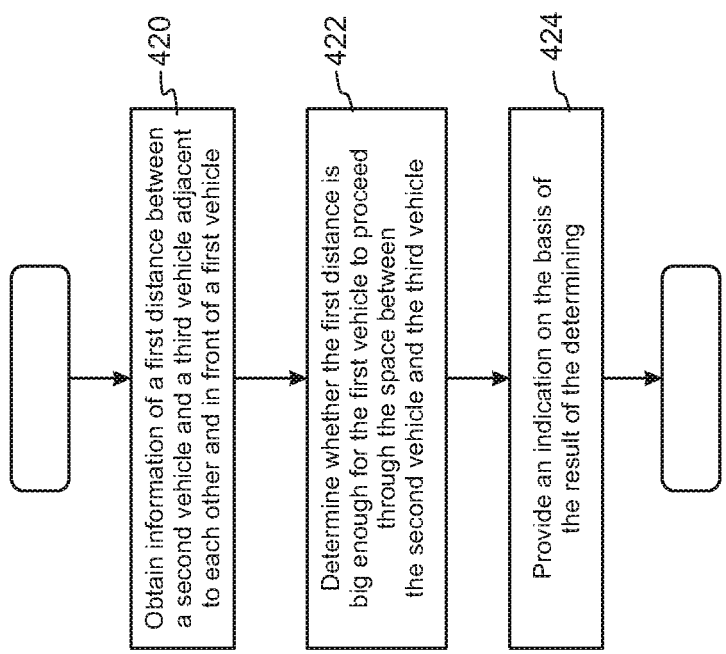
FIG. 10 illustrates an embodiment of a method as a flowchart, in accordance with an embodiment.

Accordingly, the operations of FIGS. 5 and 10 define an algorithm for configuring a computer or processing circuitry (e.g., processor) to perform an example embodiment. In some cases, a general purpose computer may be configured to perform the functions shown in FIGS. 5 and 10 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for determining whether lane filtering may be performed comprising:
    obtaining information of a first distance between a second vehicle and a third vehicle adjacent to each other and in front of a first vehicle, wherein the second vehicle and third vehicle are travelling in the same direction in neighboring lanes and the first distance is a lateral distance;
    determining whether the first distance is big enough for the first vehicle to proceed through the space between the second vehicle and the third vehicle; and
    providing an indication on a basis of a result of the determining.

2. The method according to claim 1, said obtaining information comprising:

obtaining information of a location of the second vehicle and a location of the third vehicle; and using the location information to determine the first distance.

3. The method according to claim 1 comprising:

obtaining information of a second distance between a fourth vehicle in front of the second vehicle in a first queue and a fifth vehicle in front of the third vehicle in a second queue, wherein the second distance is a lateral distance; and using the first distance information and the second distance information to determine how long the first vehicle is able to proceed through the space between the first queue and the second queue.

4. The method according to claim 3, said obtaining information comprising:

measuring the first distance by a distance measuring apparatus of the second vehicle; or measuring the second distance by a distance measuring apparatus of the fourth vehicle.

5. The method according to claim 4 comprising:

sending the first distance information or the second distance information to the first vehicle; or sending the first distance information or the second distance information to a communication network.

6. The method according to claim 1 comprising:

providing at least the first distance information to a server in a cloud computing network; and performing the determining by the server.

7. The method according to claim 1 comprising:

receiving lane filtering information from a driver of the first vehicle regarding whether to proceed through a space between adjacent vehicles; and sending the lane filtering information to one or more other vehicles in front of the first vehicle.

8. The method according to claim 1 comprising:

determining whether the first vehicle is approaching at least one of the second vehicle and the third vehicle; and if so, how fast, to decide whether to perform said obtaining information of a first distance;

determining whether the first distance is big enough; and providing said indication.

9. The method according to claim 1 comprising:

obtaining information on dimensions of one or more of the first vehicle or the second vehicle; and using the dimensions information in determining whether the first distance is big enough.

10. The method according to claim 1 comprising:

sequentially receiving, by a server, location information on one or more vehicles;

receiving by the server at least:

indication from one of the one or more vehicles that the first vehicle is about to lane filter due to a queue which the first vehicle is approaching; and a current location of the first vehicle;

wherein the method further comprises:

examining by the server which of the one or more vehicles are in the neighborhood of the first vehicle, which is about to lane filter, by using the location information to determine whether lane filtering is possible or not; and sending information whether lane filtering is possible or not to the first vehicle which is about to lane filter.

11. The method according to claim 1 comprising:

determining whether a blinker of the first vehicle has been switched on; and if so, examining whether another lane in the same direction of the road is free or if lane filtering is possible between vehicles on other lanes of the road.

12. The method according to claim 1, said determining whether the first distance is big enough comprising:

comparing the first distance with a predetermined minimum distance value; and if the first distance is larger than the predetermined minimum distance value, deducing that the space between the second vehicle and the third vehicle is big enough for the first vehicle to proceed through the space between the second vehicle and the third vehicle.

13. A computer program product embodied on a non-transitory computer readable medium, comprising computer program code configured to, when executed on at least one processor, cause an apparatus or a system to:

obtain information of a first distance between a second vehicle and a third vehicle adjacent to each other and in front of a first vehicle, wherein the second vehicle and third vehicle are travelling in the same direction in neighboring lanes and the first distance is a lateral distance;

determine whether the first distance is big enough for the first vehicle to proceed through the space between the second vehicle and the third vehicle; and provide an indication on a basis of a result of the determining.

14. The computer program embodied on the non-transitory computer readable medium of claim 13, the computer program code configured to, when executed on at least one processor, cause the apparatus or the system to:

provide at least the first distance information to a server in a cloud computing network, wherein the server determines whether the first distance is big enough for the first vehicle to proceed through the space between the second vehicle and the third vehicle.

15. The computer program embodied on the non-transitory computer readable medium of claim 13, the computer program code configured to, when executed on at least one processor, cause the apparatus or the system to:

receive lane filtering information from a driver of the first vehicle regarding whether to proceed through a space between adjacent vehicles.

16. The computer program embodied on the non-transitory computer readable medium of claim 15, the computer program code configured to, when executed on at least one processor, cause the apparatus or the system to:

send the lane filtering information to one or more other vehicles in front of the first vehicle.

17. An apparatus for lane filtering comprising at least one processor and memory including computer program code, the memory and computer program code configured to, with the at least one processor, cause the apparatus to perform a method comprising:

obtaining information of a first distance between a second vehicle and a third vehicle adjacent to each other and in front of a first vehicle, wherein the second vehicle and third vehicle are travelling in the same direction in neighboring lanes and the first distance is a lateral distance;

determining whether the first distance is big enough for the first vehicle to proceed through the space between the second vehicle and the third vehicle; and providing an indication on a basis of a result of the determining.

18. The apparatus for lane filtering of claim 17, the memory and computer program code configured to, with the at least one processor, cause the apparatus to perform the method further comprising:
    providing at least the first distance information to a server in a cloud computing network; and
    performing the determining by the server.

19. The apparatus for lane filtering of claim 17, the memory and computer program code configured to, with the at least one processor, cause the apparatus to perform the method further comprising:
    receiving lane filtering information from a driver of the first vehicle regarding whether to proceed through a space between adjacent vehicles; and
    sending the lane filtering information to one or more other vehicles in front of the first vehicle.

* * * * *